United States Patent
Slangan et al.

(10) Patent No.: US 11,006,624 B2
(45) Date of Patent: May 18, 2021

(54) SUPPORT APPARATUS FOR SMOKING ANIMAL LURE

(71) Applicants: Timothy Francis Slangan, Springbrook Township, PA (US); William James Holeva, Dickson City, PA (US); Daniel Joseph Holeva, Woodstock, GA (US)

(72) Inventors: Timothy Francis Slangan, Springbrook Township, PA (US); William James Holeva, Dickson City, PA (US); Daniel Joseph Holeva, Woodstock, GA (US)

( * ) Notice: Subject to any disclaimer, the term of this patent is extended or adjusted under 35 U.S.C. 154(b) by 319 days.

(21) Appl. No.: 15/220,284

(22) Filed: Jul. 26, 2016

(65) Prior Publication Data

US 2017/0027158 A1 Feb. 2, 2017

Related U.S. Application Data

(60) Provisional application No. 62/197,134, filed on Jul. 27, 2015.

(51) Int. Cl.
*A01M 31/00* (2006.01)
*B65D 85/50* (2006.01)
*B65D 85/24* (2006.01)

(52) U.S. Cl.
CPC .......... *A01M 31/008* (2013.01); *B65D 85/24* (2013.01); *B65D 85/50* (2013.01)

(58) Field of Classification Search
CPC .. A01M 31/008; A01M 31/00; A01M 1/2066; A01M 29/12; B65D 85/50; B65D 85/24; B65D 21/086; B65D 41/04; B65D 51/242; F41H 3/00

USPC ............................................ 206/315, 315.11
See application file for complete search history.

(56) References Cited

U.S. PATENT DOCUMENTS

| | | | |
|---|---|---|---|
| 5,555,665 A | 9/1996 | Fore | |
| 5,618,548 A | 4/1997 | Dawson | |
| 5,914,119 A * | 6/1999 | Dawson | A01N 25/20 424/40 |
| 6,029,650 A * | 2/2000 | Treants | F23D 3/16 126/204 |
| 6,648,239 B1 * | 11/2003 | Myny | A01M 31/008 239/34 |
| 2004/0234567 A1 | 11/2004 | Dawson | |
| 2015/0251809 A1 * | 9/2015 | Jasin | F41H 3/00 220/8 |

OTHER PUBLICATIONS

Tink's, website, Tink's "Smoke Stack" (Item No. W6110) product documentation, http://www.tinks.com/shop/products/smoke-stack_w6110.aspx.

* cited by examiner

*Primary Examiner* — King M Chu
*Assistant Examiner* — James M Van Buskirk

(57) ABSTRACT

A support apparatus for a smoking animal lure comprises a tubular body that surrounds and shields the smoking animal lure, a support structure to hold the smoking animal lure in the tubular body, and a structure to attach a cord to suspend the support apparatus. This apparatus allows for the retrieval and replacement of the smoking animal lure with minimal unwanted movement and noise.

4 Claims, 5 Drawing Sheets

SUPPORT APPARATUS FOR SMOKING ANIMAL LURE

CROSS REFERENCE TO RELATED APPLICATIONS

This application claims the benefit of provisional application Ser. No. 62/197,134, filed Jul. 27, 2015 by William James Holeva, one of the present inventors.

FEDERALLY SPONSORED RESEARCH

Not Applicable.

SEQUENCE LISTING OR PROGRAM

Not Applicable.

BACKGROUND-PRIOR ART

The following is a tabulation of known prior art that presently appears relevant:

US Patents

| Patent Number | Kind Code | Issue Date | Patentee |
|---|---|---|---|
| 5555665 | A | Sep. 17, 1996 | Fore, John C. |
| 5618548 | A | Apr. 8, 1997 | Dawson, Richard A. |

US Patent Applications

| Publication Number | Kind Code | Pub. Date | Applicant |
|---|---|---|---|
| US20040234567 | A1 | Nov. 25, 2004 | Dawson, Richard A. |

Nonpatent Literature Documents

Tink's "Smoke Stack" (Item No. W6110) product documentation, http://www.tinks.com/shop/products/smoke-stack_w6110.aspx

BACKGROUND OF THE INVENTION

This invention relates to scented game lures used in hunting. More specifically, the invention relates to devices employed to support smoking game lures.

Game hunters often create and disperse a scent in a specific area to attract the game that they are hunting and to cover their own scent. One of the methods for creating these scents is the use of smoking animal lure sticks, similar to incense. An example of these smoking animal lures may be found in U.S. Pat. No, 5,618,548. An example is also currently marketed under the trade name "Tink's Smoke Sticks."

These smoking animal lures are intended to be inserted into the ground around the area being hunted. Accessories have been developed to protect the smoking animal lure from becoming extinguished or compromised by natural elements. Examples of these shielding devices may also be found in U.S. Pat. No. 5,618,548. Another example may be found in US Patent Application Number 20040234567. These devices sit on the ground around the smoking animal lure, which is partially inserted into the ground. These devices shield the smoking animal lure from wind and rain while still allowing enough airflow to support the combustion of the smoking animal lure.

Inserting the smoking animal lure into the ground has several disadvantages. The smoking animal lures have a limited burn life. Typically the smoking animal lures will burn completely in a couple of hours, well before the hunter is ready to retire. Replacement of smoking animal lures currently requires the hunter to physically go to the smoking animal lure and replace it. As the hunter is typically in a stand or a tree, replacement of the smoking animal lure requires climbing down from the perch, walking to the lure, and climbing back into the stand or tree once the smoking animal lure has been replaced. This creates highly undesirable noise and movement that is likely to scare game away from the area. Lengthening the burn time of the smoking animal lure requires increasing the size of the smoking animal lure, making it expensive, difficult to transport, and susceptible to breakage during transit.

Inserting the smoking animal lure into the ground also presents safety hazards. The combustion of the smoking animal lure can create fires in dry grass or leaves adjacent to the smoking animal lure. Wind can upset current shields, increasing the likelihood of either extinguishing the smoking animal lure or setting fire in adjacent grass. Finally, the repeated climbing into and out of the stand or tree increases the chances of falls and resulting injury.

For the foregoing reasons, there is a need for a cost effective device will protect a smoking animal lure from being extinguished by the elements and allow the hunter to replace the smoking animal lure quickly and safely with minimal movement and noise.

SUMMARY

In accordance with the present invention, a support apparatus for a smoking animal lure comprises a tubular body that surrounds and shields the smoking animal lure, a support structure to hold the smoking animal lure in the tubular body, and a structure for attaching a cord to suspend the support apparatus. This apparatus allows a user to safely hang the smoking animal lure by the cord from a stand or tree and quickly retrieve and replace the smoking animal lure with minimal movement and noise.

DESCRIPTION OF REFERENCE NUMERALS

1 Tubular Body
2 Lid
3 Fastening Point
5 Lure Support
6 Cord
7 Smoking Animal Lure 8 Hole (to support lure)
9 Screw Threads (in the tubular body)
10 Screw Threads (in the lure support)
11 Intake Vents
12 Exhaust Vents

DETAILED DESCRIPTION

Figure 5:
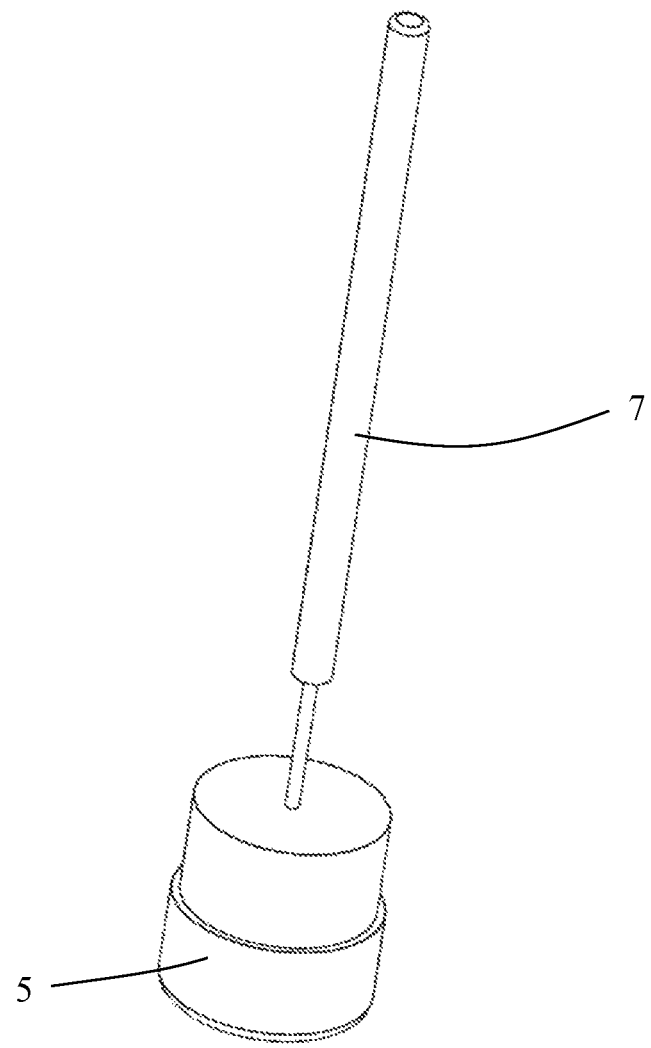
FIG. 5 shows the lure support with the smoking animal lure installed therein.

One embodiment of the support apparatus for smoking animal lures is shown in the attached figures. FIG. 5 shows the smoking animal lure 7 inserted into the lure support 5. The smoking animal lure 7 is not claimed but is shown in the drawings for reference. It is mentioned here because it is discussed throughout this detailed description.

Figure 1:
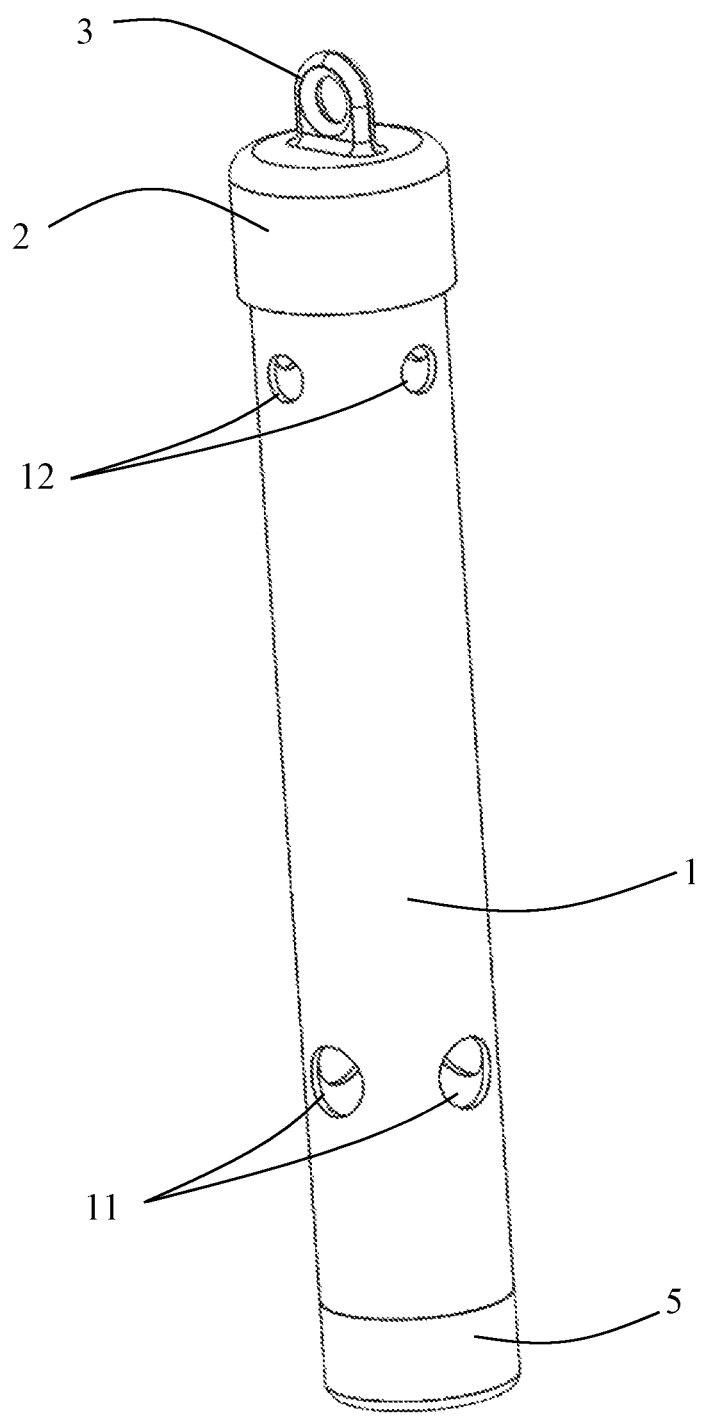
FIG. 1 shows the entire support apparatus assembled.

FIG. 1 shows an external view of the assembled support apparatus. The support apparatus comprises a tubular body 1 that surrounds the smoking animal lure 7. In this embodiment, the tubular body 1 is a round tube of synthetic material, such as Acrylonitrile butadiene styrene (ABS), polyvinyl chloride (PVC) or nylon. The tubular body 1 measures 1 to 2 inches in diameter with a wall thickness of less than about 0.3 inch. Use of synthetic polymer allows for reduced manufacturing costs, reduction of weight while maintaining the desired degree of rigidity, and allows more flexibility to create an attractive appearance. While a flame retardant material is preferred, many rigid materials may be used, including many metals, plastics, and composites. The typical height of the tubular body 1 is about 12 inches to allow a 10-inch long smoking animal lure 7 to easily fit inside. The stated diameter supports optimal combustion of the smoking animal lure and dispersal of scented vapors. Other diameters, wall thicknesses, and heights of tubular body 1 may be used provided that the structure remains rigid and the interior of the tubular body 1 allows adequate airflow to support combustion of the smoking animal lure 7. While the preferred embodiment is cylindrical, the tubular body 1 may also be a variety of shapes, including elliptical or polygonal.

Figure 2:
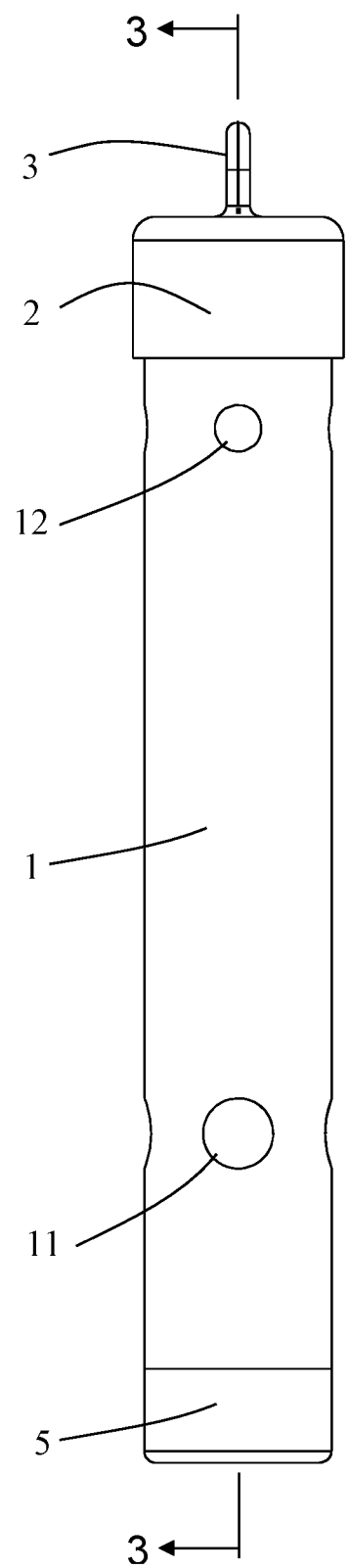
FIG. 2 is an elevation view to show the section view orientation in FIG. 3.
Figure 3:
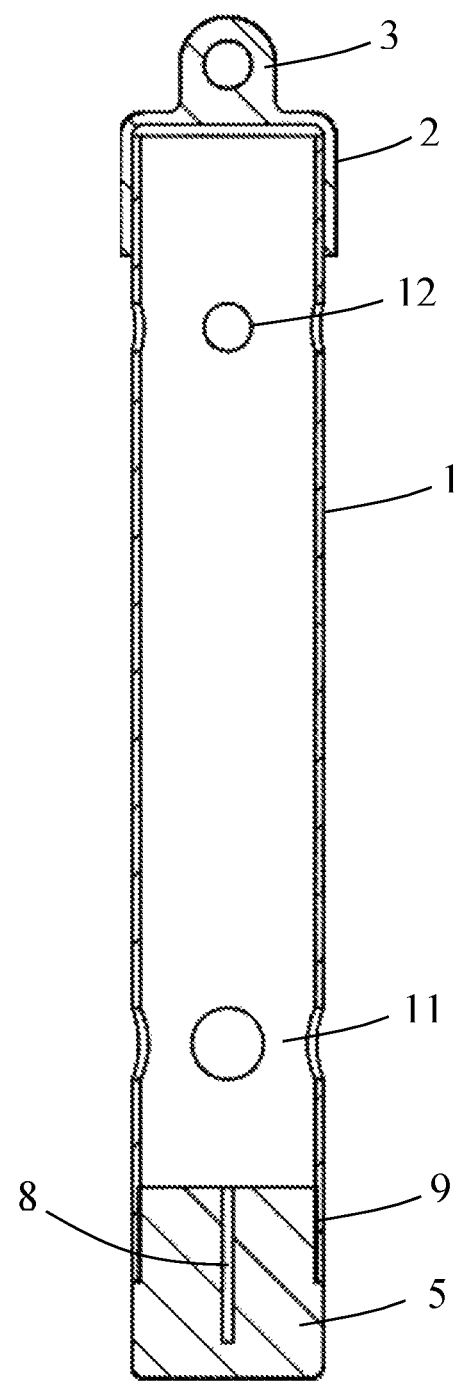
FIG. 3 is a section view of the assembled support apparatus.

FIGS. 2 and 3 show a section view of the support apparatus to provide a clear depiction of how the parts are assembled. A lid 2 is attached to the top of the tubular body 1. In the preferred embodiment, the lid 2 is manufactured of the same material as the tubular body 1 and is glued to the tubular body 1 to form single rigid component. As such, the lid 2 is sized such that the internal surface of the lid 2 fits closely over the top of the tubular body 1. The lid 2 provides a shield that protects the smoking animal lure 7 from rain and other debris. The lid 2 may also be formed as part of the tubular body 1.

Figure 6:
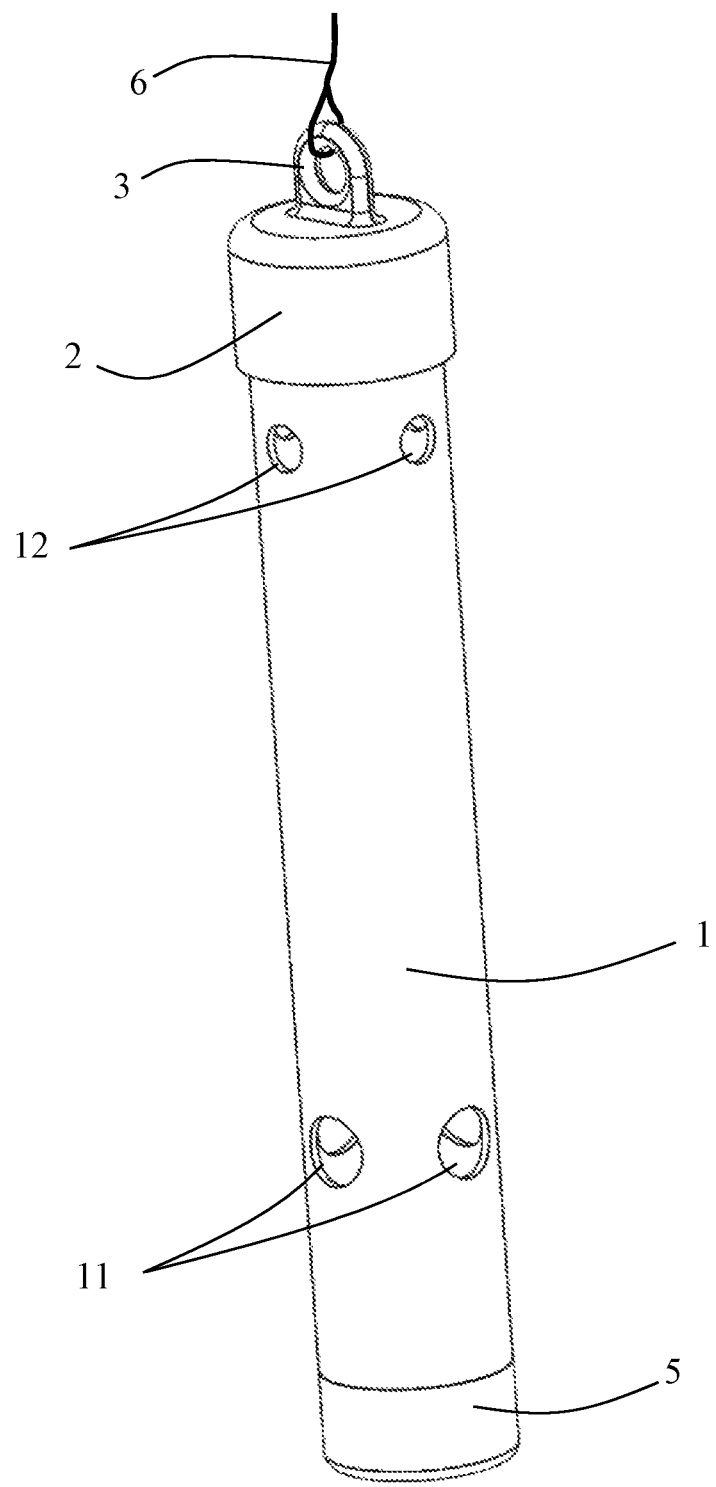
FIG. 6 shows the assembled support apparatus with the cord attached.

The support apparatus also includes a fastening point 3. FIG. 6 shows the complete assembly with a cord 6 fastened to the fastening point 3 of the support apparatus. The cord 6 is not claimed but shown in the drawing for reference. The cord 6 may be any cordage material including twine, string, rope, and wire. Thin braided synthetic rope is preferred to provide a lightweight and weather-resistant support. In the preferred embodiment, the fastening point 3 is an eyelet formed as part of the lid 2 and comprised of the same material. The preferred embodiment of the eyelet has a toroidal shape with an internal diameter of 0.3 to 1 inch. This diameter allows for ease of attaching the cord while not increasing the size of the apparatus to the point where transport or packaging are obstructed. Other potential embodiments of the fastening point 3 may include a formed hook or a fastener attached to the lid 2.

Figure 4:
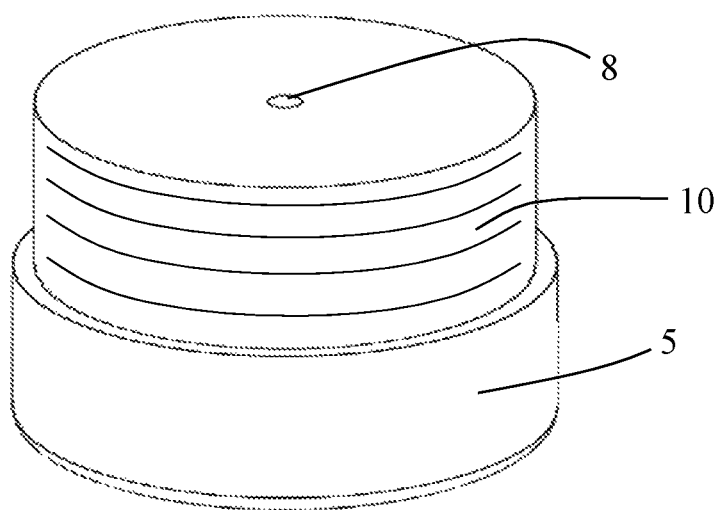
FIG. 4 shows a detailed view of the lure support detached from the tubular body.

The support apparatus also includes a lure support 5. In the preferred embodiment, the lure support 5 comprises a cylindrical structure attached to the bottom of the tubular body 1. FIG. 4 provides a detailed view of the lure support 5 detached from the tubular body 1. At the center of the lure support 5 is a hole 8 into which the smoking animal lure 7 may be set. FIG. 5 shows the smoking animal lure 7 inserted into the hole 8. In the preferred embodiment, the hole 8 is 0.13 inch in diameter and one inch deep. The hole 8 holds the smoking animal lure 7 in an upright position in the interior of the tubular body 1. This prevents the smoking animal lure 7 from resting against the internal surface of the tubular body 1, thus preventing accidental extinguishment and damage to the tubular body. In the preferred embodiment, the tubular body has internal screw threads 9 in the lower portion of the interior thereof. The lure support 5 has screw threads 8 along its exterior vertical surface that engage the screw threads 9 of the tubular body. This engagement attaches the lure support 5 to the tubular body 1.

To support combustion of the smoking animal lure 7, the support apparatus further comprises holes in the lower and upper portions of the device to support intake of air and exhaust of combustion gases respectively. In the preferred embodiment, the intake vents 11 comprise 4 holes measuring approximately 0.6 to 0.9 inch in diameter in the lower portion of the tubular body 1 and the exhaust vents 12 comprise four holes measuring approximately 0.3 to 0.6 inch in the upper portion of the tubular body 1. The quantity and shape of these openings may be varied to support optimal rate of combustion of the smoking animal lure 7 inside.

To use the preferred embodiment described, the user attaches a string or other type of cord 6 to the eyelet by threading the string through the hole in the eyelet and tying a knot. The user then detaches the lure support 5 from the tubular body 1 by rotating the lure support 5 relative to the tubular body 1 and thus unscrewing it therefrom. The user removes any debris left by previous smoking animal lures from the hole 8 in the center of the lure support 5. The user inserts a new smoking animal lure 7 into the hole 8 in the center of the lure support 5, holding the lure support 5 so that the smoking animal lure 7 is oriented vertically above the lure support 5. The user lights the smoking animal lure 7. The user then places the tubular body 1 over the smoking animal lure 7 and screws the lure support 5 back into the tubular body 1, maintaining the upright position of the apparatus. Air will enter the intake vents 11 and combustion gases will exhaust through the exhaust vents 12 to maintain combustion of the smoking animal lure 7. Once the lure support 5 is securely reattached to the tubular body 1, the user holds the string and releases the support apparatus so that the support apparatus hangs from the string. The user then pays out the string, lowering the support apparatus containing the smoking animal lure 7 to the desired height below the elevated stand or tree branch. The user may then tie the string to the stand or a branch to maintain the height of the support apparatus. The orientation of the smoking animal lure 7 in the lure support 5 will prevent the lure from falling against the interior of the tubular body 1. When the smoking animal lure 7 has completely burned and thus extinguished, the user may pull the string to retrieve the support apparatus and repeat the procedure. This may be done without leaving the stand or tree and with minimal unnecessary movement.

Although the description above contains many specificities, these should not be construed as limiting the scope of the invention, but rather as an exemplification of one embodiment thereof. Many other variations are possible. For example, the lure support 5 may be attached to the tubular body 1 with a friction fit or hasps or a pliable member that fits into a detent when attached. The fastening point 3 may be a hole in the lid 2 or a hook or a cleat or a keyring or other structure to which the cord 6 may be securely attached. Metal, plastic, or composites may be used to fabricate the lid, lure support 5, and tubular body 1. Thus, the scope of the invention should be determined by the appended claims and their legal equivalents.

We claim:

1. A support apparatus used by hunters to disperse animal attractant scent comprising
   a. a rigid tubular flame-retardant body made of synthetic material and having a diameter of 1.5 inches and a length of 12 inches to shield a smoking animal lure,
   b. a plurality of openings sized to support optimal combustion of said smoking animal lure, said openings including
      i. four intake vents with a diameter of 0.8 inch located in a lower portion of said tubular body,
      ii. four exhaust vents with a diameter of 0.5 inch located in an upper portion of said tubular body,
   c. whereby combustion air may enter said tubular body through said intake vents and exhaust gases may exit said tubular body through said exhaust vents,
   d. a lure support detachably attached to the tubular body and further comprising a hole 0.13 inch in diameter to hold said smoking animal lure inside of said tubular body,
   e. said lure support being attachable to said tubular body,
   f. and
   g. a lid
   h. said lid manufactured of the same material as said tubular body and being glued to said tubular body opposite from said lure support,
   i. said lid further comprising a fastening point formed as part of said lid,
   j. whereby a cord may be attached to the fastening point to suspend the support apparatus from above.

2. The support apparatus of claim 1 wherein
   d. said lure support further comprises male threads along the top exterior circumference of said lure support and
   e. said rigid tubular body comprises female threads along the lower portion of the interior of said rigid tubular body and
   f. said interior threads and said exterior threads are interoperable.

3. The support apparatus of claim 1 wherein said hole in the lure support extends through the lure support.

4. The support apparatus of claim 1 wherein
   a. said fastening point is a toroidal shaped eyelet with an internal hole 0.5 inch in diameter and
   b. said cord is rope and
   c. said cord may be fastened to said eyelet.

* * * * *